No. 672,565. Patented Apr. 23, 1901.
C. T. McCARROLL.
TANK HEATER.
(Application filed Nov. 28, 1900.)
(No Model.)
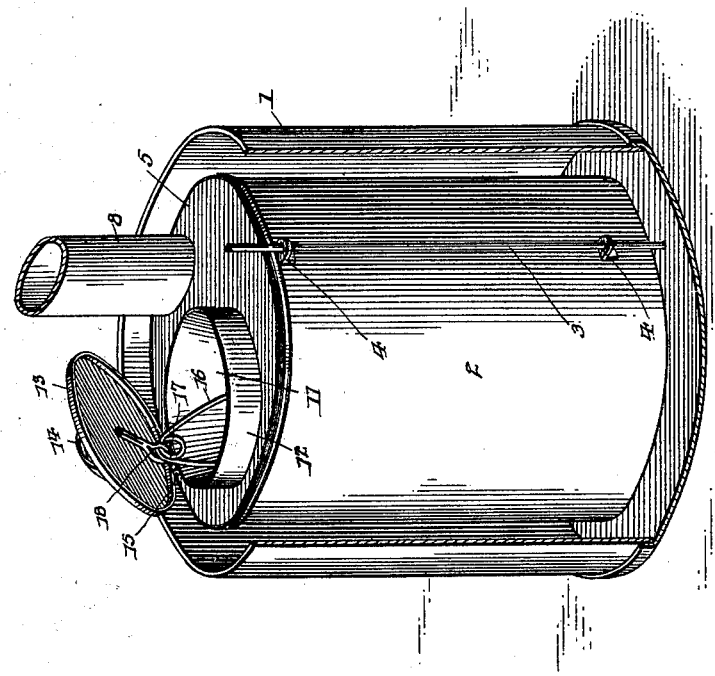
C. T. McCarroll, Inventor.
Witnesses

UNITED STATES PATENT OFFICE.

CHARLES T. McCARROLL, OF OTTUMWA, IOWA.

TANK-HEATER.

SPECIFICATION forming part of Letters Patent No. 672,565, dated April 23, 1901.

Application filed November 28, 1900. Serial No. 38,046. (No model.)

*To all whom it may concern:*

Be it known that I, CHARLES T. MCCARROLL, a citizen of the United States, residing at Ottumwa, in the county of Wapello and State of Iowa, have invented a new and useful Tank-Heater, of which the following is a specification.

This invention relates to heaters, and has for its object to provide an improved tank-heater which is applicable to any ordinary water or feed tank for heating the contents thereof. It is furthermore designed to secure a powerful draft for the fire and to have the draft under control, so as to regulate the burning of the fuel.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of the improved heater within a tank, the latter being broken away. Fig. 2 is a central longitudinal sectional view thereof. Fig. 3 is a detail perspective view of the draft-regulator.

Like characters of reference designate corresponding parts in all of the figures of the drawings.

Referring to the drawings, 1 designates any ordinary water or feed tank, within which is placed the body or shell 2 of the improved heater. To prevent lateral displacement of the heater, there is provided one or more rods 3, each of which passes downwardly through a pair of perforate ears 4, projecting outwardly from the heater, the lower end of the rod being received within a socket or recess in the bottom of the tank.

The open upper end of the heater is closed by means of a removable top plate 5, which has a pendent marginal rim or flange 6, which fits snugly within the heater, so as to prevent lateral displacement thereof. At one side of the top plate there is provided a smoke-opening 7, to which is removably fitted a smoke-pipe 8 of suitable length.

Opposite the smoke-opening there is provided a comparatively large and circular draft-opening 9, having an upstanding marginal rim 10 for the support of an inverted conical draft-regulator 11, which projects downwardly into the interior of the shell of the heater. The opposite ends of the draft-regulator are open, and the larger upper end is provided with a pendent external marginal flange 12, which embraces the rim 10 and rests upon the top of the heater. The upper end of the conical regulator is provided with a lid or cover 13, having a central handle 14 and connected to the regulator by means of a suitable hinge 15, so that the regulator may be opened and closed at will, whereby the cover forms a damper to control the draft through the conical tube.

For holding the lid at any desired angle there is provided a support therefor in the form of an inverted substantially U-shaped spring 16, which has its intermediate portion bent into a ring or eye 17, which is loosely engaged with a loop 18 upon the inner side of the lid, so as to pivotally connect the spring to the lid. The opposite free ends of the spring extend downwardly within the conical draft-tube and pass outwardly through corresponding openings 19 in opposite sides of said tube, the latter having the opposite inwardly pressed or deflected portions 20 at the lower sides of the opening, so that the end portions of the spring may have substantially long frictional engagements with the exterior of the draft-tube, whereby the lid 13 may be held at any desired angle. The lower end of the tube is also provided with a plurality of perforations 21, so as to distribute the draft laterally as well as downwardly.

It will be understood that the regulator-tube is removable, so that fuel may be inserted through the draft-opening in the top plate without removing the latter. Also the tube is rotatably adjustable within the draft-opening, so as to dispose the upwardly-inclined lid in a position to form a deflector for directing the external air or wind downwardly into the draft-tube. It is preferable to have an inverted conical draft-tube, as such a shape produces a blast, and thereby increases the force of the draft, so as to send the latter clear to the bottom of the heater.

What is claimed is—

1. A tank-heater, comprising a shell or body, a top therefor having a smoke-opening and a fuel-entrance opening, and an open-ended draft-tube removably suspended within the fuel-entrance opening, and having means for adjustably closing the open upper end thereof, said tube being removable to permit of the introduction of fuel through the entrance-opening.

2. A tank-heater, having a fuel-entrance opening, a smoke-opening, an open-ended conical draft-tube supported upon the walls of the fuel-opening and having its smaller end projected into the interior of the heater, the tube also being removable outwardly through the fuel-opening to permit of the introduction of fuel, and means for controlling the open outer end of the draft-tube.

3. A heater having a draft-inlet in communication with the fire-pot thereof, a tilting closure therefor, which is projected exteriorly of the heater when open and forms a deflector to direct a draft into the opening, and means for holding the tilting closure open.

4. A heater having a draft-opening in its top and in communication with the fire-pot thereof, an upwardly-tilting closure for the opening, which is projected above the top of the heater when open and forms a deflector to direct a draft into the opening, and means for holding the tilting closure open.

5. A heater, having an open-ended inverted conical draft-tube extending through the top of the heater and in communication with the fire-pot thereof, an upwardly-swinging closure for the upper end of the tube, the closure being projected above the top of the heater when open and thereby forming a deflector to direct a draft into the tube, and adjustable means for supporting the closure in a plurality of tilted positions to control the open outer end of the tube.

6. A tank-heater having a draft-opening in the top thereof, an upwardly-tilting closure and deflector for the opening, and means for adjusting the angle of the combined closure and deflector.

7. A tank-heater, having a draft-opening in the top thereof, a draft-tube suspended within the opening, a tilting cover for the draft-opening, and a pendent cover-support loosely connected to the cover and passing frictionally through an opening in the tube.

8. A tank-heater, having a draft-tube, a tilting cover therefor, and a substantially U-shaped spring-support having its intermediate portion loosely connected to the cover, and its opposite free portions passing frictionally through opposite perforations in the tube.

9. A tank-heater, having a draft-opening in the top thereof, an upstanding marginal rim surrounding the opening, an inverted conical draft-tube, having an upper external pendent marginal flange embracing the upstanding rim, a cover hinged to the tube, and an inverted substantially U-shaped spring-support, having its intermediate part pivotally connected to the under side of the cover, and its opposite free end portions passing frictionally through corresponding perforations in the tube.

10. As a new article of manufacture, an inverted conical draft-tube for heaters, the upper and larger end of the tube having a combined tilting closure and deflector-plate and means for adjusting the inclination thereof.

11. As a new article of manufacture, a draft device for heaters, comprising an inverted conical tube, which is open at opposite ends, and provided with an upper external marginal flange, a combined closure and draft-deflector hinged to the top of the tube, and a substantially U-shaped spring-support loosely connected to the cover and having its opposite portions passing frictionally through openings in the tube.

In testimony that I claim the foregoing as my own I have hereto affixed my signature in the presence of two witnesses.

CHARLES T. McCARROLL.

Witnesses:
C. B. CHILCOTE,
E. R. GARRETT.